United States Patent [19]

Berlin et al.

[11] 3,928,489
[45] Dec. 23, 1975

[54] METHOD FOR INCREASING THE THERMOSTABILITY OF ORGANOPOLYSILOXANES

[76] Inventors: Alfred Anisimovich Berlin, Leninsky prospekt, 57, kv. 9; Roza Mikhailovna Aseeva, 1 ulitsa Stroitelei, 7, korpus 1, kv. 133; Semen Markovich Mezhikovsky, Raketny bulvar, 13, korpus 2, kv. 62; Alla Ilinichna Sherle, ulitsa Petrovka, 23/10, kv. 46-a; Nadezhda Alexeevna Tsepalova, ulitsa Garibaldi, 19, korpus 4, kv. 8; Evgeny Alexandrovich Goldovsky, ulitsa Udaltsova, 10, kv. 107; Tatiana Vladimirovna Zelenetskaya, ulitsa Fersmana, 7, kv. 49; Rozalia Komalovna Fatkulina, ulitsa Osipenko, 44, kv. 6; Alexandr Samoilovich Kuzminsky, Frunzenskaya naberezhnaya, 38, kv. 91, all of Moscow, U.S.S.R.

[22] Filed: Apr. 9, 1973

[21] Appl. No.: 349,082

Related U.S. Application Data

[63] Continuation of Ser. No. 116,612, Feb. 18, 1971, abandoned.

[52] U.S. Cl....... 260/827; 260/45.75 R; 260/45.8 N; 260/46.5 G; 260/46.5 UA; 260/88.3 R
[51] Int. Cl.².................. C08L 39/04; C08L 83/06
[58] Field of Search... 260/827, 824, 88.3 R, 45.8 N

[56] References Cited
UNITED STATES PATENTS

| | | | |
|---|---|---|---|
| 2,224,944 | 12/1940 | Young | 260/45.8 N |
| 3,061,565 | 10/1962 | Collings | 260/45.75 |
| 3,082,181 | 3/1963 | Brown et al. | 260/45.75 |
| 3,098,836 | 7/1963 | Bobear | 260/45.75 |
| 3,137,670 | 6/1964 | Maneri | 260/45.75 |
| 3,142,655 | 7/1964 | Bobear | 260/45.75 |
| 3,177,177 | 4/1965 | Bobear | 260/45.75 |

FOREIGN PATENTS OR APPLICATIONS

| | | | |
|---|---|---|---|
| 540,127 | 10/1941 | United Kingdom | 260/88.3 R |

*Primary Examiner*—Wilbert J. Briggs, Sr.
*Attorney, Agent, or Firm*—Holman & Stern

[57] ABSTRACT

A method of increasing the thermostability of organopolysiloxanes and compositions containing the same comprising introducing into organopolysiloxanes and compositions based on them 0.01 to 10 weight parts of a polyethynylpyridine or synergistic mixtures of 0.01 to 10 weight parts of a polyethynylpyridine with 1 to 10 weight parts of metal salts or an oxide of a metal per 100 weight parts of organopolysiloxane.

The resulting thermostable organopolysiloxanes and compositions based on them find application in aviation, ship building industry, rocketry, and in other branches of the industry.

9 Claims, No Drawings

METHOD FOR INCREASING THE THERMOSTABILITY OF ORGANOPOLYSILOXANES

This is a continuation of application Ser. No. 116,612, filed Feb. 18, 1971, and now abandoned.

The present invention relates to methods of stabilizing polymers, and more particularly to a method for increasing the thermostability of polyorganosiloxanes with ageing at high temperatures, said material finding application the aviation, ship-building and rocketry industries and in other industries.

Known in the art are method for increasing the thermostability of polyorganosiloxanes by introducing various stabilizing additives thereinto (such as iron oxide, titanium dioxide, oxides of cobalt, copper, manganese, nickel, salts of iron, amides, certain phosphates, dialkylsebactes, etc.).

Thus, a method is known for increasing the thermostability of polyorganosiloxanes, residing in that introduced into polyorganosiloxanes are such stabilizing additives as $Cu_2O$, $CuO$; $Cr_2O_3$; $MnO_2$; $Ni_2O_3$, or hydroxides of yttrium, zirconium, etc; in an amount of 0.001 to 8 parts by weight per 100 parts by weight of the polyorganosiloxanes.

The testing of the stabilizing effect shows that relative elongation at rupture of a test sample (a polyorganosiloxane composition without a stabilizer) is 23% after 7 days of ageing at a temperature of 250°C, while in the case of a composition with $Cu_2O$ as a stabilizing additive this characteristic is 80%.

The relative elongation at rupture of a composition with $Ni_2O_3$ as a stabilizer is 200% after 16 hours of ageing at a temperature of 300°C, while the reference sample shows 60%.

Also known is a method for increasing the thermostability of polyorganosiloxanes by incorporating 0.01 to 5 weight percent of Zn, Fe, Al or Be hydroxide thereinto.

When heated to a temperature of 270°C during 15 minutes, the non-stabilized sample losses 28.7% of its initial weight, while the stabilized polymer loses only 13% of its initial weight. Another known method for increasing the thermostability of polyorganosiloxanes envisages the use of 0.05 to 5 weight percent of amides as a stabilizing additive. When tested for determining its physico-mechanical properties after ageing during 48 hours at a temperature of 300°C, the reference sample (without a stabilizer) becomes destroyed, while that stabilized with 0.4 weight percent of diphenyl urea preserves 40% of its initial strength and shows 50% relative elongation (Federal Republic of Germany Pat. No. 1,110,410; Czechoslovakian Pat. No. 99,408; U.S. Pat. No. 2,495,838).

Said methods are disadvantageous in that they do not ensure adequate thermostability of stabilized polyorganosiloxanes at high temperatures.

The use of the above-mentioned stabilizers cannot prevent all those processes which may be lead to the destruction of polyorganosiloxanes at a temperature of 300°C, while at a temperature above 300°C the stabilizing effect is essentially lost altogether.

Some of the said methods are also disadvantageous in that the stabilizing effect is lost in case a filler or other components of rubber mixtures are used.

The object of the present invention is to enhance the thermostability of polyorganosiloxanes and compositions based thereon.

The organopolysiloxanes employed in the present invention are conventional and well-known in the art. The methods of producing such organopolysiloxanes are well known in the prior art and are described in the literature.

Said object is accomplished by that in a method for increasing the thermostability of polyorganosiloxanes by introducing stabilizing additives thereinto, according to the invention, as a stabilizing additive use is made of a polyethynylpyridine, or a mixture of a polyethynylpyridine with a metalliferous component. Polyethynylpyridines may be produced by polymerizing corresponding monomers. Synthesis and some properties of polyethynylpyridines are described in the following studies; as, J. Okamoto, D. Alia, Chem. and Industry, 1964, 1311; A. A. Berlin, G. B. Belova, A. I Sherle, N. A. Markova, High-molecular compounds, Chimica Industria Acta, No.1, 172 (1969).

It is preferable that polyethynylpyridines should be introduced into polyorganosiloxanes in an amount of 0.01 to 10 parts by weight per 100 parts by weight of the polyorganosiloxanes.

As polyethynylpyridines it is preferable to use poly-2-methyl-5-ethynylpyridine, poly-4-ethynylpyridine, poly-2-ethynylpyridine.

The Applicants have detected the synergistic effect when using mixtures of polyethynylpyridines with metalliferous compounds that are selected from the group consisting of metal salts, such as cerium naphthenate, lanthanum naphthenate, ytterbium naphthenate, or the oxides of metals such as copper oxide, barium oxide, aluminum oxide, cerium oxide, and iron oxide.

The mixture of polyethynylpyridines with a metalliferous component to be introduced should preferably be composed of 0.01 to 10 weight parts of a polyethynylpyridine and 1 to 10 weight parts of a metalliferous component per 100 weight parts of polyorganosiloxanes.

As a metalliferous component, the aforementioned metal oxides and salts of metals should be preferred.

For enhancing the stabilizing effect, cerium oxide, iron oxide or copper oxide are preferred as the metal oxides.

For enhancing the stabilizing effect, cerium naphthenate, lanthanum naphthenate or ytterbium naphthenate are preferred as the salts of metals.

The stabilizing additives are introduced as follows.

Polyorganosiloxanes belonging to those that contain aliphatic, aromatic, arylaliphatic and unsaturated radicals at the silicon atom and compositions based on such polyorganosiloxanes are mixed with stabilizing additives either in the dry state or in combined solutions or suspensions in organic solvents are prepared with subsequent removal of the latter.

At present it is an established fact that the ageing of polyorganosiloxanes proceeds in two ways, namely, there takes place oxidation of the organic portion of the macromolecule by the radical mechanism and depolymerization of the main polymeric chain with the formation of low--molecular organosilicone products. The latter process proceeds in accordance with the heterolytic mechanism from the hydroxyl ends of the polymeric chains and is initiated by the catalyst residues. The destructive processes thus taking place are accompanied by cross-linking and loss of elasticity of the polymer.

The introducing of polyethynylpyridines as a stabilizing additive makes it possible to reduce the rate of oxidation processes up of temperatures close to 400°C and preserve the elastic properties of polyorganosiloxanes when they are heated to said temperatures.

This is attained due to the fact that polyethynylpyridines inhibit oxidation processes and at the same time suppress the development of heterolytic processes. Polyethynylpyridines are preserved in the polymer without exhibiting any noticeable changes when the polymer is heated to high temperatures. Thus, for example, derivatographic analysis of poly-2-methyl-5-ethynyl-pyridine has shown its decomposition with the evolution of gaseous products to commence at a temperature of 328°–330°C, with only 12–14 weight percent of the total initial quantity to have escaped by 400°C. Polyethynylpyridines are readily soluble in organic solvents and are compatible with polyorganosiloxanes.

The stabilizing effect of a polyethynylpyridine is enhanced when it is introduced as a stabilizing additive in a mixture with a metalliferous component.

Due to the introduction of polyethynylpyridines or a mixture of a polyethynylpyridine with a metalliferous component as stabilizing additives, the present method ensures an enhancement in the thermostability of polyorganosiloxanes, when ageing, up to 400°C.

The stabilizing effect is not diminished in case a filler is introduced or when vulcanization is carried out.

For a better understanding of the present invention, given hereinbelow are examples illustrating the way in which the proposed method for increasing the thermostability polyorganosiloxanes can be realized.

EXAMPLE 1

100 parts by weight of polymethylvinylsiloxane rubber comprising vinyl units, prepared on a sulphuric-acid catalyst and having a neutral character of the aqueous extract, are mixed on conventional mill rolls at room temperature with 1 part by weight of poly-2-methyl-5-ethynylpyridine. This mixture is subjected to thermooxidation ageing at temperatures of 300° to 350°C, records being made of the kinetics of weight losses and changes in the elastic properties of the samples with time. Similar specimens are heated at a constant rate of 3 deg/min with the temperature of the commencement of the specimen intensive decomposition being determined thermogravimetrically and the temperature interval of the exothermal peak which is responsible for the oxidation of the organic radicals being determined with the help of the differential thermal anaylsis method.

For comparison specimens of rubber without any additives and with an additive consisting of 5 parts by weight of $Fe_2O_3$ are tested under the same conditions.

The results are presented in Table 1.

EXAMPLE 2

100 parts by weight of rubber similar to that described in Example 1 are mixed on mill rolls with 40 parts by weight of a fine disperse silica filler (white soot) and 1 part by weight of poly-2-methyl-5-ethynyl-pyridine. The composition thus prepared is subjected to ageing at a temperature of 350°C and also under heating at a constant rate of 3 deg/min. For comparison, under similar conditions a composition is prepared and tested which consists of rubber with 20 to 40 parts by weight of white soot as a filler and with 3 parts by weight of $Fe_2O_3$ as an additive. The test results are presented in Table 3.

EXAMPLE 3

100 parts by weight of industrial polydimethylsiloxane rubber with a molecular weight of $4.5.10^5$ obtained on a sulphuric-acid catalyst and featuring neutral character of the aqueous extract are mixed on mill rolls with 3 parts by weight of poly-2-methyl-5-ethynylpyridine. The tests are carried out under the conditions similar to those described in Example 1. The results are presented in Table 3.

EXAMPLE 4

100 parts by weight of rubber similar to that used in Example 3 are mixed with 1 part by weight of poly-2-methyl-5-ethynylpyridine and then 20 parts by weight of a fine disperse silica filler (white soot) are gradually introduced into the mixture so that it should be evenly distributed in the polymer mass in the course of milling. The resulting composition, after ageing in air at a temperature of 350°C during 3 hours, loses 19% of its initial weight while preserving the elasticity. Weight losses in the reference specimen (without the use of the stabilizers recommended in the present invention) amount to 28%.

EXAMPLE 5

The process is carried out as described in Example 4, but poly-4-ethynylpyridine is introduced as a stabilizing additive. Weight losses after 3 hours of ageing in air at a temperature of 350°C amount to 21%.

EXAMPLE 6

100 parts by weight of a polyorganosiloxanes elastomer containing methyl, phenyl and a small number of vinyl groups are mixed with 0.5 part by weight of poly-2-methyl-5-ethynylpyridine and 20 parts by weight of white soot. When heated in air at a temperature of 350°C during 3 hours, the specimen loses 16% of its weight while preserving its rubber-like properties. The reference sample without the stabilizing additive under the same conditions loses 27% of its weight.

EXAMPLE 7

100 parts by weight of rubber similar to that used in Example 6 are mixed with 1 part by weight of poly-2-methyl-5-ethynyl-pyridine. When the test specimen is heated in air at a rate of 3 deg/min, its intensive decomposition commences at a temperature of 398°C and the exothermal peak characterizing oxidation of organic radicals lies in the range of 390°–403°C. The reference specimen (without the stabilizer) starts decomposing at a temperature of 342°C and the corresponding exothermal peak lies within the temperature range of 325°–342°C.

EXAMPLE 8

The process is carried out as described in Example 7, but 1 part by weight of poly-4-ethynylpyridine is introduced as a stabilizer. The intensive decomposition of this mixture, when heated in air at a rate of 3 deg/min, commences at a temperature of about 400°C. The exothermal peak which characterizes the oxidation has shifted by 60°–65°C towards higher temperatures as compared with the non-stabilized specimen.

EXAMPLE 9

Polyorganosiloxane rubber similar to that described in Example 1, but differing in that the terminal OHgroups of the polymeric chains are substituted by trimethoxysilyl ones, is mixed in benzene with 1 weight part of poly-2-methyl-5-ethynylpyridine. After the removal of the solvent under vacuum (rarefaction of $10^{-2}$ mm Hg), the specimen is heated in air at a rate of 3 deg/min. The temperature of the commencement of its weight losses is 362°C, by 400°C the losses amounting only to 3% of the initial weight. The sample without the addition of poly-2-methyl-5-ethynylpyridine features the commencement of destruction at a temperature of 335°C and by 400°C the reference sample loses 10% of its initial weight. The exothermal peak characterizing the oxidation of hydrocarbon radicals is shifted for the stabilized sample by more than 50°C towards higher temperatures.

EXAMPLE 10

Into the organo-silicon polymer described in the preceding Example there are introduced on mill rolls 20 parts by weight of a filler (white soot) and 1 part by weight of poly-2-methyl-5ethynylpyridine per 100 parts by weight of the polysiloxane. The tests of the resulting mixture under non-isothermal heating conditions (3 deg/min) show the temperature of the commencement of intensive decomposition to be 383°C and the exothermal peak of the oxidation of hydrocarbon radicals to lie within 395°–415°C. The mixture filled with 20 parts by weight of white soot but containing no stabilizer starts decomposing at a temperature of 350°C. The exothermal peak corresponding to the oxidation lies within the range of 342°–369°C.

EXAMPLE 11

On mill rolls at room temperature 100 parts by weight of rubber similar to that described in Example 1 are mixed with 40 parts by weight of white soot, 5 weight parts of iron oxide and 0.5 part by weight of poly-2-methyl-5-ethynylpyridine. The resulting mixture is subjected to ageing in air at a temperature of 350°C during 3 hours. Under these conditions the test specimen loses 10.4% of its weight, but remains soft and elastic. The sample of the rubber mixture consisting of 100 parts by weight of rubber, 40 parts by weight of white soot and 5 weight parts of $Fe_2O_3$ but containing no stabilizing additive, after being tested under the same conditions, loses 14.1% of its weight and becomes an easily crumbling mass devoid of elastic properties. A sample consisting of 100 parts by weight of rubber, 40 weight parts of the filler and 0.5 part by weight of poly-2-methyl-5-ethynylpyridine, though preserves its elastic properties, loses approximately twice as much in its weight as the specimen stabilized with a mixture of poly-2-methyl-5-ethynylpyridine and iron oxide.

A non-stabilized mixture consisting of 100 parts by weight of rubber and 40 parts by weight of white soot loses 24% of its weight and becomes a brittle vitreous mass.

EXAMPLE 12

The process is carried out as described in Example 11, there being introduced as a stabilizer 3 parts by weight of poly-2-methyl-5-ethynylpyridine and 5 parts by weight of $Fe_2O_3$. After the ageing the specimen loses 13.3% of its weight and preserves elasticity.

EXAMPLE 13

At room temperature on mill rolls there are mixed 100 parts by weight of rubber similar to that described in Example 1 with 40 parts by weight of white soot, 3 weight parts of cerium oxide and 0.5 part by weight of poly-2-methyl-5-ethynylpyridine. The resulting mixture is subjected to ageing in air at a temperature of 350°C during 3 hours. The test specimen loses 12.4% of its weight and remains soft and elastic. A sample of a rubber mixture consisting of 100 parts by weight of rubber, 40 parts by weight of white soot and 3 parts by weight of $CeO_2$, after being tested under the same conditions, loses about 13% of its weight, becomes covered with a rigid film and easily crumples.

EXAMPLE 14

The process is carried out by following the procedure described in Example 13, 3 parts by weight of cerium oxide and 1 part by weight of poly-2-methyl-5-ethynylpyridine being introduced as a stabilizer. After ageing under the conditions similar to those of Example 13, the specimen loses 13.2% of its weight but preserves elastic properties.

EXAMPLE 15

On mill rolls a mixture is prepared consisting of 100 parts by weight of rubber similar to that of Example 1, 1 part by weight of poly-2-methyl-5-ethynylpyridine and 1 part by weight of cerium naphthenate. The mixture is heated in air under non-isothermal conditions. The temperature of the commencement of intensive decomposition is about 390°C, the exothermal oxidation peak lies within 378°–408°C. Tested under the same conditions is a specimen containing 100 parts by weight of rubber and 1 part by weight of cerium naphthenate. This specimen starts decomposing at a temperature of 340°C and the exothermal peak that characterizes oxidation lies within 346°–360°C.

EXAMPLE 16

The process is carried out as described in Example 15. As a stabilizing additive 1 part by weight of poly-2-methyl-5-ethynylpyridine and 1 part by weight of ytterbium naphthenate are used. Being heated at a rate of 3 deg/min, the stabilized specimen starts decomposing at a temperature of 385°C. A specimen consisting of 100 parts by weight of rubber and 1 part by weight of ytterbium naphthenate shows the commencement of destruction at a temperature of 333°C and the corresponding exothermal peak lies within 318°–340°C.

EXAMPLE 17

The process is carried out at in Example 15, with 3 parts by weight of lanthanum naphthenate being used as a metalliferous component of the stabilizing additive. The characteristics exhibited by this specimen when ageing do not differ from those of the specimen described in Example 15. A specimen containing 100 parts by weight of rubber and only 3 parts by weight of lanthanum naphthenate as the additive starts intensively losing in weight at a temperature of 350°c, while the exothermal peak lies within 330°–360°C.

EXAMPLE 18

The process is carried out as described in Example 15, with the use of gadolinium oxide as the metalliferous component of the stabilizing additive.

The results of the test when the sample is subjected to ageing under non-isothermal heating conditions are similar to those featured by the sample in Example 15.

The destruction of the specimen containing 100 parts by weight of rubber and 1 part by weight of gadolinium naphthenate commences at a temperature of 342°C and the exothermal peak lies within 321°–350°C.

EXAMPLE 19

On mill rolls at room temperature there are mixed 100 parts by weight of rubber similar to that used in Example 1 with 50 parts by weight of white soot, 1 part by weight of poly-2-methyl-5-ethynylpyridine and 3 parts by weight of BaO as a metalliferous component. The resulting mixture is tested for resistance to thermooxidation ageing under the conditions of non-isothermal heating (3 deg/min), with records being made of the commencement of intensive decomposition and the range of the exothermal peak, the respective temperature values being found to be 255°C and 365°–416°C.

The results of testing a specimen consisting of 100 parts by weight of rubber, 50 parts by weight of white soot and 3 parts by weight of BaO show 280°C and 352°–375°C respectively. When such a specimen is heated during 3.5 hours in air under isothermal conditions (350°C), it is completely cross-linked and becomes a vitreous product. Under the same conditions the rubber mixture comprising the stabilizing composition remains elastic and soft.

EXAMPLE 20

The process is similar to that described in Example 19. 3 parts by weight of $Al_2O_3$ are used as a metalliferous component of the stabilizing additive.

The specimen is tested for resistance to thermooxidation ageing under the conditions similar to those described in Example 19. For comparison, under the same conditions a specimen is subjected to ageing, which contains no poly-2-methyl-5-ethynylpyridine.

The tests have shown the stabilized rubber mixture to feature the commencement of intensive weight losses at a temperature of 365°C and the exothermal peak to lie within 360°–408°C. The respective values for the sample containing no poly-2-methyl-5-ethynylpyridine are 350°C and 350°–379°C.

For heating effected in air during 3.5 hours at a temperature of 350°C, the weight losses are as follows.

For the stabilized specimen, 21%, the specimen remaining soft and elastic; for the specimen containing no poly-2-methyl-5-ethynylpyridine, 24%, the specimen becoming a vitreous mass.

EXAMPLE 21

The process is carried out as in Example 19. 3 parts by weight of CuO are used as a metalliferous component.

The tests performed under the conditions similar to those described in Example 19 have shown the decomposition to commence at 370°C and the exothermal peak to lie within 360°–410°C. The weight losses during 3.5 hours of ageing in air at 350°C are 18%; the specimen preserves its elastic properties.

The results of concurrent testing of the specimen consisting of 100 parts by weight of rubber, 3 parts by weight of CuO and 50 parts by weight of white soot have shown the decomposition temperature thereof to be 350°C, the exothermal peak to lie within 350°–379°C and the weight losses at a temperature of 350°C during 3.5 hours to be 26.5%. After ageing under isothermal conditions the specimen is brittle.

EXAMPLE 22

A rubber mixture is prepared on mill rolls, consisting of 100 parts by weight of rubber similar to that used in Example 1, 50 parts by weight of white soot, 3 weight parts of poly-2-methyl-5-ethynylpyridine and 5 parts by weight of $Fe_2O_3$. The mixture is subjected to ageing in air during 6 hours at a temperature of 350°C or during 36 hours at a temperature of 320°C. After that the percent of equilibrium swelling in toluene at a temperature of 25°C and the content of the sol-fraction (solubility) are determined. The results are presented in Table 4. For comparison tabulated in the same Table are the results of testing the specimens which either contain no stabilizing additive or contain only one of the components of such additive.

EXAMPLE 23

Prepared on mill rolls are rubber mixtures based on rubber similar to that used in Example 1, these mixtures containing as a filler an aerogel $SiO_2$ (hydrophobized aerosil) and as a stabilizing additive 3 parts by weight of poly-2-methyl-5-ethynylpyridine and 5 parts by weight of $Fe_2O_3$. The conditions and results of the tests are presented in Table 5.

EXAMPLE 24

Prepared on mill rolls is a rubber mixture based on a poly-methylvinylsiloxane rubber differing from that described in Example 1 by the content of vinyl groups, said mixture containing 100 parts by weight of the rubber, 50 parts by weight of white soot, 5 parts by weight of $Fe_2O_3$, 0.25 part by weight of poly-2-methyl-5-ethynylpyridine and 0.3 part by weight of dicumyl peroxide. After press vulcanization (150°C, 20 min, 75 kg/cm$^2$) and thermostating in air (200°C, 6 hours), specimens (plates 0.5 mm thick and plugs 4 mm in diameter) are subjected to thermooxidation ageing. After 6, 12, 24 and 60 hours at a temperature of 250°C and 1–4 hours at a temperature of 300°C the overstrain accumulation in the plugs is determined, and after ageing at temperatures of 320° and 350°C conditional equilibrium modulus is determined for the plugs and plates. The results of the tests are presented in Tables 6 and 7.

EXAMPLE 25

The process is carried out as described in Example 24, the difference being in that 0.5 part by weight of poly-2-methyl-5-ethynylpyridine is introduced into the rubber mixture prior to the vulcanization. The results of the tests are given in Tables 6 and 7.

EXAMPLE 26

The process is carried out as described in Example 24, the difference being in that 1 part by weight of poly-2-methyl-5-ethynylpyridine is introduced into the rubber mixture. The results of the tests are presented in Tables 6 and 7.

EXAMPLE 27

The process is similar to that described in Example 24, the only difference being in that 2 parts by weight of poly-2-methyl-5-ethynylpyridine are introduced into the rubber mixture. The results of the tests are presented in Tables 6 and 7.

EXAMPLE 28

The process is carried out as described in Example 24, with the exception that 3 parts by weight of poly-2-methyl-5-ethynylpyridine are introduced into the rubber mixture. The results of the tests are presented in Tables 6 and 7.

EXAMPLE 29

On the basis of rubber similar to that described in Example 24 a rubber mixture is prepared on mill rolls that comprises 100 parts by weight of the polysiloxane, 35 parts by weight of silica as a filler, 5 parts by weight of iron oxide, 0.25 part by weight of poly-2-methyl-5-ethynylpyridine and 0.5 part by weight of dicumyl peroxide. After vulcanizing under the conditions similar to those described in Example 24, the specimen is subjected to thermooxidation ageing at a temperature of 300°C during 8 days and at 320°C during 60 hours, after which the conditional equilibrium modulus is determined. The results are presented in Table 8 in which data are also given pertaining to the testing of a specimen containing only $Fe_2O_3$ as the stabilizer.

EXAMPLE 30

The process is carried out as described in Example 29, the only difference being in that 0.5 part by weight of poly-2-methyl-5-ethynylpyridine is introduced into the rubber mixture. The results of the tests are presented in Table 8.

EXAMPLE 31

The process is carried out as described in Example 29, the only difference being in that 1 part by weight of poly-2-methyl-5-ethynylpyridine is introduced into the rubber mixture. The results of the tests are presented in Table 8.

Table 1

| | | | Heating under isothermal conditions | | | |
|---|---|---|---|---|---|---|
| | | Heating at a rate of 3 deg/min | Temperature range of exothermal peak that characterizes oxidation | | Weight | Characteristics of specimen |
| Nos. | Specimen | Temperature of commencement of intensive weight losses, °C | of organic radicals of polyorganosiloxanes, °C | Weight losses at 300°C | losses at 350°C during 3 hrs, % | after testing under isothermal conditions |
| 1. | Polymethylvinylsiloxane rubber comprising vinyl units | 320 | 305–325 | 50% during 10 hrs | 34 | vitreous, brittle |
| 2. | Polymethylvinylsiloxane rubber comprising vinyl units, 100 weight parts; poly-2-methyl-5-ethynylpyridine, 1 weight part | 380 | 370–378 | 24% during 80 hrs | 15 | elastic, soft |
| 3. | Polymethylvinylsiloxane rubber comprising vinyl units, 100 weight parts; $Fe_2O_3$, 5 weight parts | 365 | 350–365 | 24% during 80 hrs | 30 | vitreous, brittle |

Table 2

| | | | Isothermal heating | | |
|---|---|---|---|---|---|
| | | Heating at a rate of 3 deg/min | Temperature range of exothermal peak that characterizes oxidation of organic radicals of polyorganosiloxane, °C | Weight losses at 350°C during 3 hrs, % | Characteristics of specimen after isothermal oxidation |
| Nos. | Specimen | Temperature of commencement of intensive weight losses, °C | | | |
| 1. | Polymethylvinylsiloxane rubber, 100 wt.pt.; white soot, 20 wt.pt. | 355 | 352–368 | 23.0 | brittle |
| 2. | Polymethylvinylsilo- | | | | |

Table 2-continued

| Nos. | Specimen | Heating at a rate of 3 deg/min — Temperature of commencement of intensive weight losses, °C | Isothermal heating — Temperature range of exothermal peak that characterizes oxidation of organic radicals of polyorganosiloxane, °C | Weight losses at 350°C during 3 hrs, % | Characteristics of specimen after isothermal oxidation |
|---|---|---|---|---|---|
|  | xane rubber, 100 wt.pt.; white soot, 40 wt.pt. | 372 | 360–390 | 23.8 | brittle |
| 3. | Polymethylvinylsiloxane rubber, 100 wt.pt.; white soot, 20 wt.pt.; poly-2-methyl-5-ethynyl-pyridine, 1 wt.pt. | 400 | 390–420 | 17.0 | elastic, soft |
| 4. | Polymethylvinylsiloxane rubber, 100 wt.pt.; white soot, 20 wt.pt.; $Fe_2O_3$, 3 wt.pt. | 373 | 370–380 | 21.6 | crumpling |

Table 3

| Nos. | Specimen | Heating at a rate of 3 deg/min — Temperature of commencement of intensive weight losses, °C | Temperature range of exothermal peak that characterizes oxidation of organic radicals of polyorganosiloxane, °C | Weight losses at 350°C during 3 hrs, % | Characteristics of specimen after isothermal oxidation |
|---|---|---|---|---|---|
| 1. | Polydimethylsiloxane rubber | 327 | 295–335 | 36.0 | vitreous, brittle |
| 2. | Polydimethylsiloxane rubber, 100 wt. pt.; poly-2-methyl-5-ethynylpyridine, 3 wt. pt. | 373 | 365–376 | 25 | elastic, soft |

Table 4

| Nos. | Rubber mixture | 350°C, 6 hours — Solubility, % | 350°C, 6 hours — Equilibrium swelling, % | 320°C, 36 hours — Equilibrium swelling, % |
|---|---|---|---|---|
| 1. | Non-stabilized | — | 177 | — |
| 2. | Containing 5 wt. pt. of $Fe_2O_3$ | 2.8 | 219 | 310 |
| 3. | Containing 3 wt. pt. of poly-2-methyl-5-ethynylpyridine | 4.6 | 216 | 212 |
| 4. | Containing 3 wt. pt. of poly-2-methyl-5-ethynylpyridine and 5 wt. pt. of $Fe_2O_3$ | 11.1 | 327 | 336 |

Table 5

| Components | Weight parts | | | |
|---|---|---|---|---|
| Polymethylvinylsiloxane rubber | 100 | 100 | 100 | 100 |
| Hydrophobized aerosil | 50 | 50 | 50 | 50 |
| Poly-2-methyl-5-ethynyl-pyridine | — | 3 | — | 3 |
| $Fe_2O_3$ | — | — | 5 | 5 |
| 350°C, 6 hours — Solubility, % | Vitreous powder | 14.8 | 1.9 | 24 |
| Equilibrium swelling, % | Vitreous powder | 386 | 245 | 538 |

Table 6

| Nos. | Stabilizer | Amount, wt. pt. | Values of Conditional Equilibrium Modulus of Rubbers after Ageing, kg/cm² | | | | | | | |
|---|---|---|---|---|---|---|---|---|---|---|
| | | | 320°C 1day | 320°C 2days | 350°C 5hrs | Plates 320°C 8days | Plugs 300°C 12days | 320°C 36hrs | 350°C 5hrs | 350°C 10hrs |
| 1. | $Fe_2O_3$ | 5 | 145 | 300 | 370 | 245 | — | 400 | 125 | 430 |
| 2. | Poly-2-me-phyl-5-ethynyl-pyridine $Fe_2O_3$ | 0.25/5 | 120 | — | — | 125 | 330 | — | — | — |
| 3. | -"- | 0.5/5 | 95 | — | — | 130 | 325 | 250 | — | — |
| 4. | -"- | 1/5 | 95 | — | — | 155 | 380 | 300 | — | — |
| 5. | -"- | 2/5 | 110 | — | — | 205 | — | — | — | — |
| 6. | -"- | 3/5 | — | 270 | 160 | — | — | — | 30 | 155 |

Table 7

| Nos. | Stabilizer | Amount, wt. pt. | Compression Overstrain Accumulation in Rubbers after Ageing | | | | | | |
|---|---|---|---|---|---|---|---|---|---|
| | | | 250°C | | | | 300°C | | |
| | | | 6 hrs | 12 hrs | 24 hrs | 60 hrs | 1 hr | 2 hrs | 4 hrs |
| 1. | $Fe_2O_3$ | 5 | 0.18 | 0.26 | 0.30 | 0.51 | 0.26 | 0.41 | 0.79 |
| 2. | Poly-2-methyl-5-ethynylpyridine and $Fe_2O_3$ | 0.25/5 | 0.20 | 0.27 | 0.29 | 0.40 | 0.23 | 0.29 | 0.48 |
| 3. | -"- | 0.5/5 | 0.17 | 0.22 | 0.25 | 0.36 | 0.22 | 0.29 | 0.45 |
| 4. | -"- | 1/5 | 0.23 | 0.30 | 0.34 | 0.49 | 0.30 | 0.39 | 0.51 |
| 5. | -"- | 2/5 | 0.26 | 0.32 | 0.41 | 0.59 | 0.38 | 0.48 | 0.62 |

Table 8

| Nos. | Stabilizer | Amount, wt. pt. | Values of Conditional Equilibrium Modulus of Rubbers after Ageing, kg/cm² | |
|---|---|---|---|---|
| | | | 300°C, 8 days | 320°C, 36 hrs |
| 1. | $Fe_2O_3$ | 5 | 115 | 600 |
| 2. | Poly-2-methyl-5-ethynylpyridine and $Fe_2O_3$ | 0.25/5 | 135 | 640 |
| 3. | -"- | 0.5/5 | 65 | 134 |
| 4. | -"- | 1/5 | 80 | 116 |

What is claimed is:

1. A method for increasing the thermostability of organopolysiloxane elastomers containing aliphatic, aromatic, arylaliphatic or unsaturated radicals at the silicon atom comprising mixing together said organopolysiloxane and about 0.01 to 10 parts by weight of a polyethynylpyridine per 100 parts by weight of organopolysiloxane.

2. A method for increasing the thermostability of organopolysiloxane elastomers according to claim 1, wherein said polyethynylpyridine is selected from the group consisting of poly-2-methyl-5-ethynylpyridine, poly-2-ethynylpyridine, and poly-4-ethynylpyridine.

3. A method for increasing the thermostability of organopolysiloxane elastomers according to claim 2, further comprising mixing in a reinforcing filler.

4. A method for increasing the thermostability of organopolysiloxane elastomers compositions according to claim 3, further comprising mixing in a curing agent, and curing the composition obtained.

5. A method for increasing the thermostability of organopolysiloxane elastomers according to claim 1, further comprising mixing in about 1 to 10 parts by weight of a metal salt selected from the group consisting of cerium naphthenate, lanthanum naphthenate, and ytterbium naphthenate per 100 parts by weight of said organopolysiloxane.

6. A method for increasing the thermostability of organopolysiloxane elastomers according to claim 1, further comprising mixing in a reinforcing filler, a curing agent, and 1 to 10 parts by weight of a salt of a metal selected from the group consisting of cerium naphthenate, lanthanum naphthenate, and ytterbium naphthenate, and curing the composition thus obtained.

7. A method for increasing the thermostability of organopolysiloxane elastomers according to claim 1, further comprising mixing in 1 to 10 parts by weight of a metal oxide selected from the group comprising copper oxide, barium oxide, aluminum oxide, cerium oxide, gadolinium oxide and iron oxide.

8. A method for increasing the thermostability of organopolysiloxane elastomers compositions according to claim 7, further comprising mixing in a reinforcing filler, and a curing agent, and curing the composition thus obtained.

9. A method for increasing the thermostability of organopolysiloxanes according to claim 1, wherein said organopolysiloxane is selected from the group consisting of polymethylvinylsiloxane, polydimethylsiloxane, polymethylphenylsiloxane, and polymethylvinylsiloxane having terminal trimethoxysilyl groups.

* * * * *